US012638100B2

(12) United States Patent
McKisic

(10) Patent No.: US 12,638,100 B2
(45) Date of Patent: May 26, 2026

(54) TANK CAR BOTTOM OUTLET VALVE OPERATING ASSEMBLY

(71) Applicant: Trinity Rail Group, LLC, Dallas, TX (US)

(72) Inventor: Aubra D. McKisic, Flower Mound, TX (US)

(73) Assignee: Trinity Rail Group, LLC, Dallas, TX (US)

( * ) Notice: Subject to any disclaimer, the term of this patent is extended or adjusted under 35 U.S.C. 154(b) by 118 days.

(21) Appl. No.: 18/417,114

(22) Filed: Jan. 19, 2024

(65) Prior Publication Data

US 2025/0122948 A1     Apr. 17, 2025

Related U.S. Application Data

(60) Provisional application No. 63/589,469, filed on Oct. 11, 2023.

(51) Int. Cl.
| | |
|---|---|
| *F16K 27/07* | (2006.01) |
| *B65D 88/54* | (2006.01) |
| *B65D 90/00* | (2006.01) |
| *F16K 31/52* | (2006.01) |

(52) U.S. Cl.
CPC .............. *F16K 31/522* (2013.01); *B61D 5/08* (2013.01); *B65D 88/54* (2013.01); *F16K 27/07* (2013.01); *Y10T 137/0402* (2015.04)

(58) Field of Classification Search
CPC ...... F16K 31/522; F16K 27/07; F16K 35/027; F16K 35/02; F16K 31/60; F16K 31/607; F16K 31/602; B61D 5/08; B61D 7/00–32; B65D 88/54; Y10T 137/20474; Y10T 137/6855; Y10T 137/7043; Y10T 137/0402; Y10T 137/0441; Y10T 137/0486; Y10T 137/0491; Y10T 137/0508; G05G 1/04; G05G 1/08
USPC ..... 251/110, 90, 95, 96, 100, 101, 213, 243, 251/244, 291–293, 255–267, 391, 251/395–399, 571–592; 137/345–350
See application file for complete search history.

(56) References Cited

U.S. PATENT DOCUMENTS

| | | | | | |
|---|---|---|---|---|---|
| 1,339,083 | A | * | 5/1920 | Wood-Smith .......... | B61D 5/008 137/385 |
| 1,369,111 | A | * | 2/1921 | Jacobs ................... | F16K 27/07 137/348 |
| 1,473,474 | A | * | 11/1923 | Drake ..................... | F16K 27/07 122/507 |
| 1,523,484 | A | * | 1/1925 | Lindstrom ............. | B61D 5/008 137/553 |
| 1,534,136 | A | * | 4/1925 | Ostrander ............... | F16K 27/07 137/243.3 |
| 1,565,913 | A | * | 12/1925 | Dosker ................... | F16K 27/07 251/219 |

(Continued)

*Primary Examiner* — Craig J Price
(74) *Attorney, Agent, or Firm* — Baker Botts L.L.P.

(57) ABSTRACT

According to particular embodiments, a valve operating assembly, such as for a tank car bottom outlet valve, comprises a slide rotationally coupled to and transversely slidable relative to a valve stem. The slide comprises a shape that facilitates rotational coupling with a handle and the slide further comprises a connector for engaging a protective plate to limit rotation of the slide about a valve rotational axis when in a first position and free to rotate about the valve rotational axis when in a second position.

19 Claims, 5 Drawing Sheets

(56)                References Cited

U.S. PATENT DOCUMENTS

| | | | | |
|---|---|---|---|---|
| 1,568,057 | A * | 1/1926 | Carr ......................... | B60P 3/225 |
| | | | | 137/59 |
| 1,985,858 | A * | 12/1934 | Gerdts .................... | F16K 27/07 |
| | | | | 210/429 |
| 2,003,915 | A * | 6/1935 | Willoughby ............ | F16K 27/07 |
| | | | | 222/510 |
| 2,745,360 | A * | 5/1956 | Lunde ...................... | B61D 7/26 |
| | | | | 251/305 |
| 3,930,634 | A * | 1/1976 | Loveless ................. | F16K 35/02 |
| | | | | 251/96 |
| 4,941,410 | A * | 7/1990 | Dalrymple .............. | B61D 5/08 |
| | | | | 251/293 |
| 5,076,539 | A * | 12/1991 | Holt ........................ | F16K 27/07 |
| | | | | 251/291 |
| 5,170,988 | A * | 12/1992 | Chronister .............. | F16K 27/07 |
| | | | | 251/293 |
| 9,623,881 | B2 * | 4/2017 | Bertram ................ | B60P 3/2205 |
| 9,694,828 | B2 * | 7/2017 | Saxton .................. | F16K 35/025 |
| 9,746,873 | B2 * | 8/2017 | Thompson ............ | F16K 31/602 |
| 9,828,006 | B2 * | 11/2017 | Thompson ............ | F16K 31/602 |
| 10,060,549 | B2 * | 8/2018 | Becherer ................. | F16K 35/02 |
| 10,274,101 | B2 * | 4/2019 | Dzolovic ............... | F16K 35/10 |
| 10,690,260 | B2 * | 6/2020 | Bogusky ................. | B61D 5/08 |

* cited by examiner

500

TANK CAR BOTTOM OUTLET VALVE OPERATING ASSEMBLY

RELATED APPLICATION

This application claims priority to U.S. Provisional Application Ser. No. 63/589,469, entitled "TANK CAR BOTTOM OUTLET VALVE OPERATING ASSEMBLY," filed Oct. 11, 2023.

TECHNICAL FIELD OF THE INVENTION

This disclosure generally relates to a valve operating assembly, and more particularly to an operating assembly for a bottom outlet valve of a tank car.

BACKGROUND

Tank cars transport a wide variety of commodities including liquids, gases and other fluids. The contents of a tank car may sometimes be potentially hazardous if appropriate safety precautions are not taken. Also, the contents of a tank car may be valuable and subject to theft or misappropriation.

Tank cars may be equipped with bottom outlet valves for loading or unloading. These valves may be ball, wafersphere, or butterfly style valves, etc., that are operated from beneath the car. They may also be plug or clapper style valves that are operated from the top of the tank. Tank cars may be equipped with a bottom washout that can be removed to facilitate cleaning of the tank's interior.

The bottom outlet valve may be opened and closed via an operating handle. The operating handle may be disengaged or removed during transportation.

SUMMARY OF THE INVENTION

The embodiments described herein include an operating assembly for a bottom outlet valve of a railway tank car. According to some embodiments, railway tank car comprises a tank for transporting a commodity and a bottom outlet valve coupled to an underside of the tank. The bottom outlet valve comprises a valve control surface. Flow of the commodity out of the tank and bottom outlet valve is controlled by rotation of the valve control surface. In some configurations the valve control surface rotates about an axis substantially perpendicular to a longitudinal center plane of the tank and parallel to the ground. In some configurations the valve control surface rotates about an axis substantially parallel to the longitudinal center plane of the tank and parallel to the ground. A position of the bottom outlet valve is controlled by a stem coaxial with the rotational axis and rotationally coupled to the bottom outlet valve. The tank car further comprises a valve operating assembly comprising a slide rotationally coupled to and transversely slidable relative to the stem and a disengagable handle. The slide and/or stem comprises a shape that facilitates rotational coupling with the disengagable handle. The tank car further comprises a protective structure (e.g., skid), that includes a protective plate, coupled to the underside of the tank approximately parallel to the longitudinal tank center plane in a fixed position offset in a direction along an axis of the stem. The slide of the valve operating assembly further comprises a connector for engaging, e.g. the protective plate, to limit rotation of the slide about the bottom outlet valve rotational axis when in a first position and free to rotate about the bottom outlet valve rotational axis when in a second position.

One advantage of particular embodiments is the when the handle is not in operation, the bottom outlet valve is locked in place, preventing accidental discharge. During operation, the handle engages the slide, which is disengaged from the protective plate and able to rotate to operate the bottom outlet valve. Also, bottom outlet valve state (i.e., closed/locked, open/unlocked) is visible external to the tank car and not obscured by the protective plate. The visibility may facilitate, for example, easier and/or faster inspection of the bottom outlet valve state. The bottom outlet valve may also be outfitted with a safety and/or security seal.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein.

DETAILED DESCRIPTION

Tank railcars transport a wide variety of commodities. To accommodate this, different types of fittings and number of fittings are used on the railcar, depending on the commodity and customer preferences, to load, unload, and check on the commodity.

Tank cars may be equipped with bottom outlet valves for loading or unloading. These valves may be ball, wafersphere, or butterfly style valves, etc., that are operated from beneath the car. They may also be plug or clapper style valves that are operated from the top of the tank. Tank cars may be equipped with a bottom washout that can be removed to facilitate cleaning of the tank's interior.

The bottom outlet valve may be opened and closed via an operating handle. The operating handle may be disengaged or removed during transportation.

Figure 1:
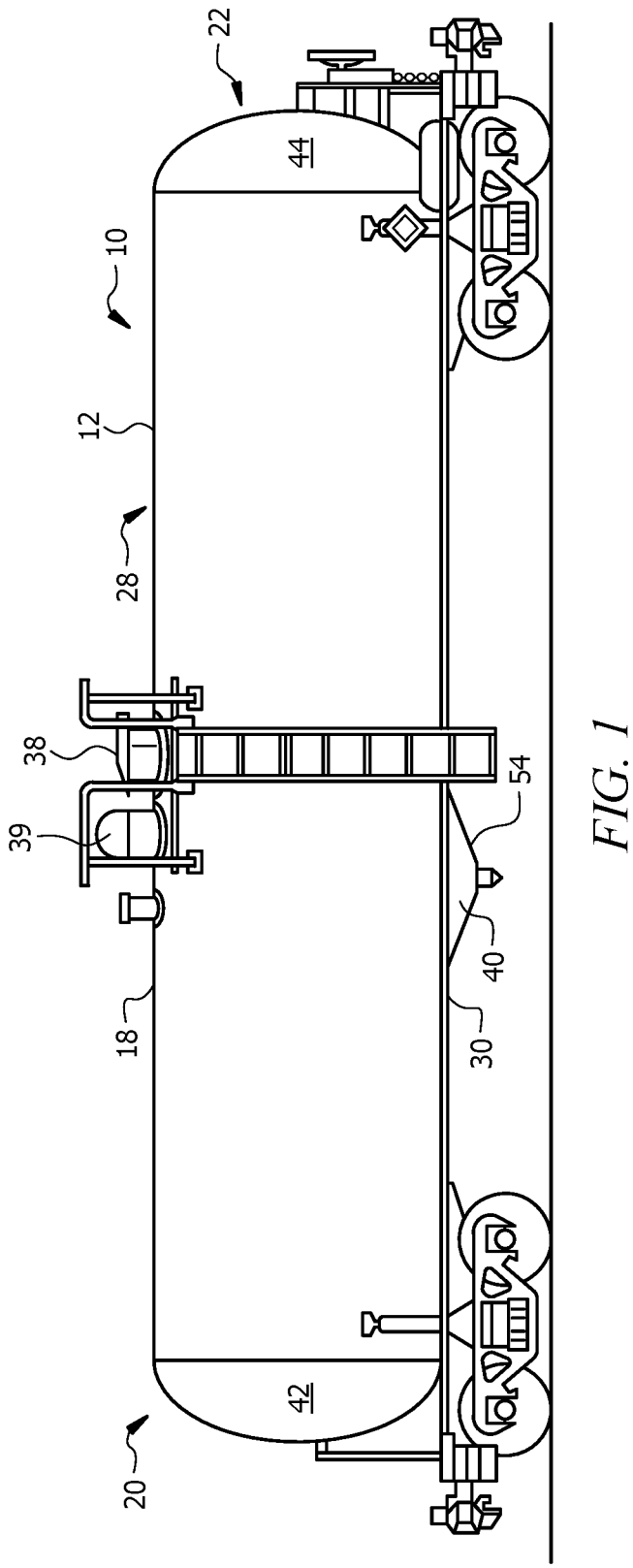
FIG. 1 is a schematic drawing illustrating a side view of a railway tank car having a bottom outlet valve.

FIG. 1 is a schematic drawing illustrating a side view of a railway tank car having a bottom outlet valve. A customary railway tank car 10 includes a tank 12. Tank 12 includes a generally elongated hollow cylinder 18 enclosed at a first end 20 and a second end 22. Tank 12 also includes an upper portion 28 and a lower portion 30.

Tank car 10 may be used to transport a variety of hazardous and non-hazardous liquid or semi-liquid bulk commodities. Fluid commodities may be loaded into tank 12 through a variety of tank fittings within the protective housing 39 or manway 38. Access to the interior of tank 12 may be provided via manway 38. Unloading of the commodities or lading may be accomplished through a variety of fittings, such as a discharge valve 40. In other embodiments, discharge valve 40 and manway 38 may be located virtually anywhere on tank 12, for example, along upper portion 28, lower portion 30, or proximate first end 20 or second end 22 of tank 12. Discharge valve 40 may referred to as a bottom outlet valve.

In addition, tank 12 may be pressurized to assist in the unloading of the lading. Further, the shape and/or configuration of tank 12 may assist in unloading the lading. For example, tank 12 may slope gradually at lower portion 30 from each end 20 and 22 toward discharge valve 40. The configuration and slope of upper portion 28 of tank 12 may conform to the configuration and slope of the lower portion 30.

A head 42 is coupled to cylinder 18 at first end 20. Similarly, a head 44 is coupled to cylinder 18 at second end 22. Cylinder 18 and heads 42 and 44 at least partially define tank 12.

Depending upon the commodity being transported and the projection distance (distance of fittings) from the shell, tank cars equipped with bottom fittings, sometimes referred to as bottom discontinuities (including bottom outlets, bottom washouts, sumps, and blind flanges) must have these fittings protected from being sheared off or otherwise damaged in the event of a derailment or by other impact that could result in the loss of lading. Bottom fittings protection may be accomplished by mounting the valve and/or valve operating mechanism inside the tank and/or by applying protective skids to the bottom of the tank. In the illustrated example, discharge valve 40 may be protected by protective structure 54 (i.e., skid 54).

Protective skids may interfere with visual inspection of the bottom fitting protected by the protective skids. Particular embodiments described herein include visual indicators that facilitate an operator quickly discerning a valve state when proximate the tank car.

Also, for safety reasons it may be beneficial if the valve operating assembly is disengaged and/or locked in place when the valve is not in operation to prevent accidental discharge. Particular embodiments prevent rotation of the valve operating assembly when the valve is not in use.

Particular embodiments and their advantages are best understood by reference to FIGS. 2 through 5, wherein like reference numbers indicate like features.

Figure 2:
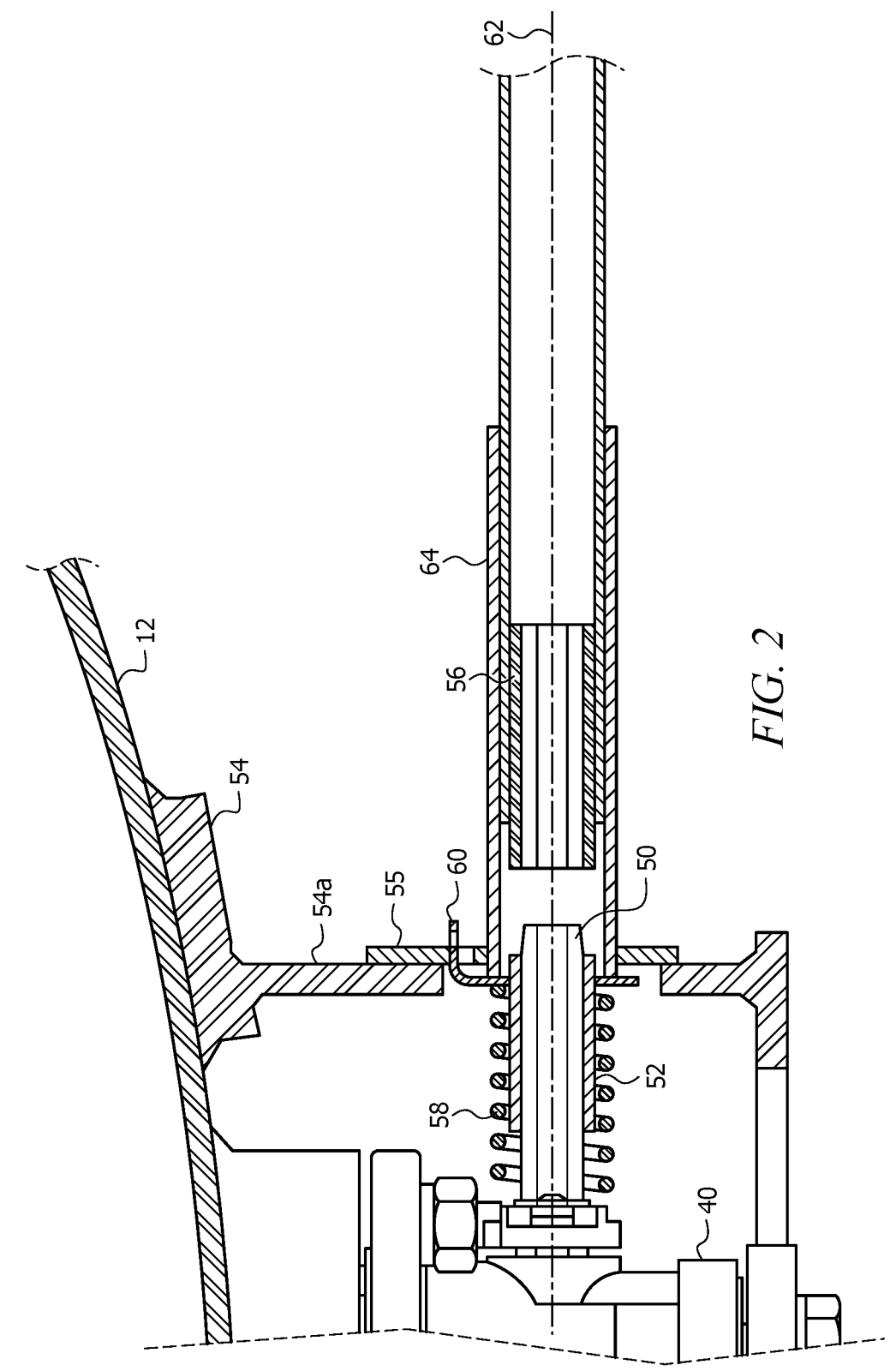
FIG. 2 is a schematic cross-section of an operating assembly for a bottom outlet valve in a closed and locked position, according to particular embodiments.

FIG. 2 is a schematic cross-section of an operating assembly for a bottom outlet valve in a closed and locked position, according to particular embodiments. The illustrated example is a partial cross section of tank 12 for transporting a commodity and bottom outlet valve 40 coupled to an underside of tank 12. Bottom outlet valve 40 is positioned at approximately the lowest point of tank 12 to facilitate flow of the commodity out of tank 12 and bottom outlet valve 40.

Bottom outlet valve 40 includes a valve control surface (e.g. ball, butterfly, etc.). Flow of the commodity out of tank 12 and bottom outlet valve 40 is controlled by rotation of the valve control surface. In one configuration, the valve control surface is rotated about an axis substantially perpendicular to a longitudinal center plane of the tank and parallel to the ground (e.g., illustrated by centerline 62). In other configurations, the valve control surface may be rotated about an axis substantially parallel to the longitudinal center plane of the tank (not illustrated). A position of bottom outlet valve 40 is controlled by stem 50 coaxial with the rotational axis and rotationally coupled to bottom outlet valve 40.

A valve operating assembly comprises slide 52 rotationally coupled to and transversely slidable relative to stem 50. Rotationally coupled means that when slide 52 is rotated, stem 50 rotates with it, and vice versa. Slide 52 is also transversely slidable, which means that slide 52 may slide along the length of stem 50 (in the horizontal direction in the illustrated example). In some embodiments, the coupling may include a slot and groove where slide 52 is free to slide horizontally, but the slot and groove rotate slide 52 and stem 50 together. In some embodiments, slide 52 and stem 50 may comprise complementary concentric structural shapes (e.g., hexagonal, octagonal, D shape, etc.) so that slide 52 is slidable with respect to stem 50, but the complementary concentric shapes rotate stem 50 when rotational force is applied to slide 52, or vice versa.

The valve operating assembly may further comprise handle 56. Handle 56 may be a disengagable handle. Slide 52 comprises a shape that facilitates rotational coupling with handle 56. As described above, the coupling may comprise complementary concentric shapes. For example, the handle may comprise a socket shape, such as a square, rectangle, hexagon, etc., that mates with a corresponding shape on the slide and/or stem to apply rotation to the slide and/or stem.

The valve operating assembly may further comprise handle guide 64. Handle guide 64 assists with coupling of handle 56 with slide 52 and/or stem 50.

Protective structure 54 is coupled to the underside of tank 12 approximately parallel to the longitudinal tank center plane in a fixed position offset in a direction along an axis of the stem. Protective structure 54 includes protective plate 54a. The protective structure may refer to the protective plates described in the Association of American Railroads (AAR) Manual of Standards and Recommended Practices Specifications for Tank Cars.

Slide 52 of the valve operating assembly further comprises connector 60 for engaging, .e.g. protective plate 54a, to limit rotation of slide 52 about the bottom outlet valve rotational axis when in a first position (valved closed) and free to rotate about the bottom outlet valve rotational axis when in a second position (valve open).

In particular embodiments, handle 56 is operable to rotationally couple to slide 52 and/or stem 50 during operation and to decouple when not in operation. The valve operating assembly may further comprise spring 58 that engages slide 52 with, e.g. protective structure 54, so that slide 52 is rotationally fixed with, e.g. protective structure 54, by applying a force parallel to the rotational axis. The spring may comprise a compression spring or a tension spring. Although the term "spring" is used herein, the spring refers to any suitable compression or tension device for applying a rebounding force to engage slide 52 with, e.g. protective structure 54, to prevent rotation of slide 52.

In particular embodiments, the valve operating assembly may further comprise fastening plate 55 coupled to handle guide 64 and protective plate 54a. In particular embodiments, when connector 60 is referred to as coupled to the protective structure, the connector may be coupled to protective plate 54a or fastening plate 55. Particular advantages of fastening plate 55 are described in more detail below with respect to FIG. 5.

In some embodiments, the slide is directly coupled with the stem. In some embodiments, the slide is coupled with the stem via an adaptor (not illustrated) rotationally coupled to and transversely slidable to the stem.

In particular embodiments, the connector for engaging the protective structure to limit rotation of the slide about the bottom outlet valve rotational axis comprises a transverse projection from the protective structure that engages a void of similar shape in the slide.

In particular embodiments, the connector for engaging the protective structure to limit rotation of the slide about the bottom outlet valve rotational axis comprises a transverse projection from the slide that engages a void of similar shape in the protective structure.

In particular embodiments, the transverse projection is visible from the side of the tank car. Thus, in addition to restricting movement of the valve, because of the configuration of the connector and the protective structure, particular embodiments provide the additional advantage of indicating a status of the operating valve (e.g., closed/locked, open/unlocked). The visibility may facilitate, for example, easier and/or faster inspection of the bottom outlet valve state.

In particular embodiments, the transverse projection accepts a security or safety seal (e.g., a safety ring). The security or safety seal provides a visual indication of whether the bottom outlet valve has been tampered with. The transverse projection may comprise an opening in connector 60 through which a safety/security seal may be attached.

In operation, a railyard operator, for example, slides/turns handle 56 towards slide 52 and/or stem 50, coupling handle 56 with slide 53 and/or stem 50. The railyard operator further slides/turns handle 56 causing slide 53 to slide along stem 50 (to the left in the illustrated example) which disengages connector 60 from protective plate 54. After connector 60 is disengaged from protective plate 54, rotation of handle 56 rotates slide 53 and stem 50 to open or close the bottom outlet valve. An example is illustrated in FIG. 3.

Figure 3:
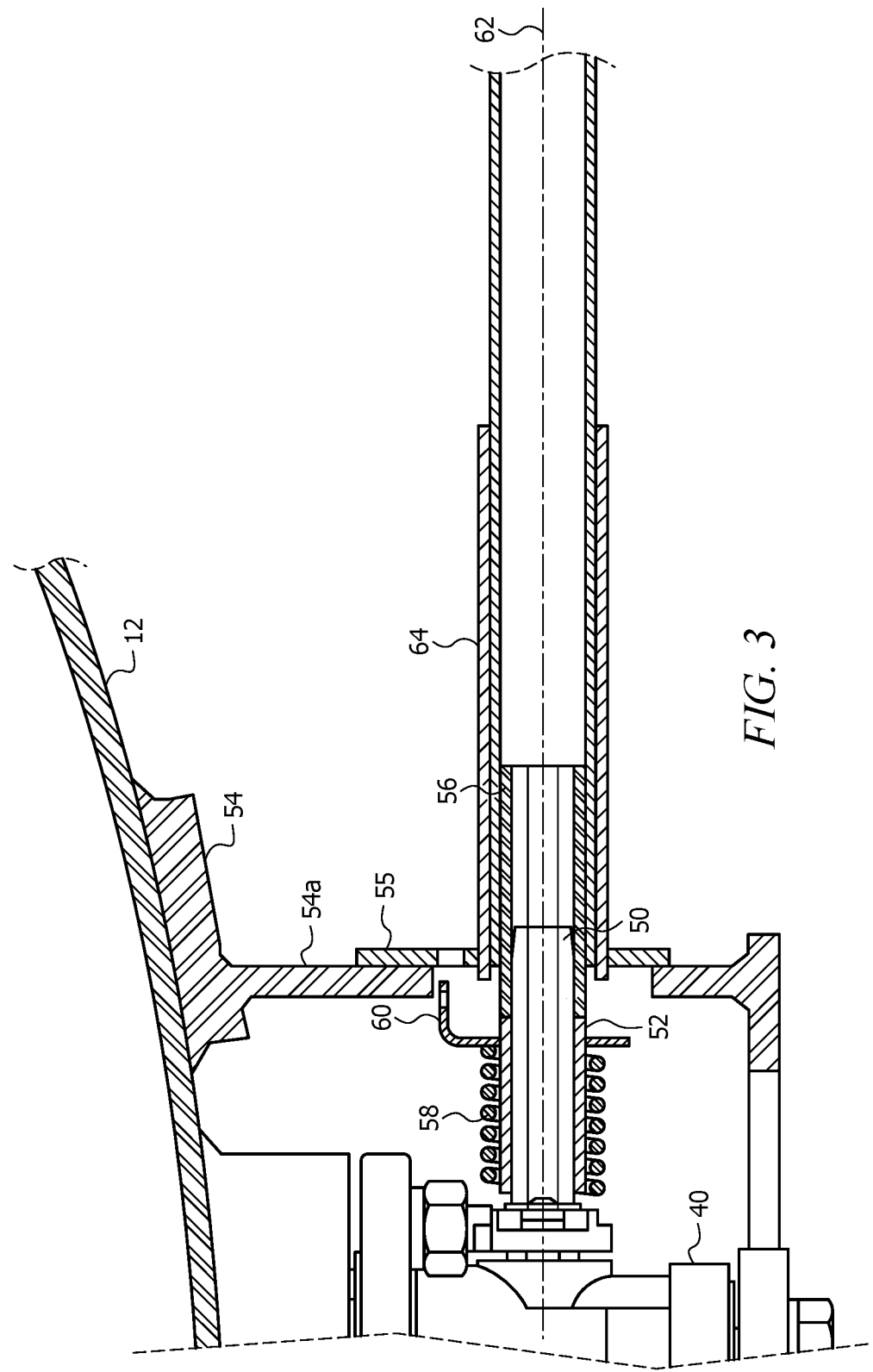
FIG. 3 is a schematic cross-section of an operating assembly for a bottom outlet valve in a closed and unlocked position, according to particular embodiments.

FIG. 3 is a schematic cross-section of an operating assembly for a bottom outlet valve in a closed and unlocked position, according to particular embodiments. In the illustrated example, handle 56 is engaged with slide 52 and coupled with stem 50, and connector 60 is disengaged from fastening plate 55. In this configuration the valve is unlocked.

To open the bottom outlet valve, handle 56 is translated in a first direction towards slide 52 and/or stem 50, coupling handle 56 with slide 52 and/or stem 50 and rotates stem 50 to an open position. To close the bottom outlet valve, handle 56 is translated in an opposite direction to rotate stem 50 to a closed position and eventually decouples from slide 52 and/or stem 50. Spring 58 then returns slide 52 and connector 60 to the locked position illustrated in FIG. 2 where connector 60 engages with fastening plate 55 and prevents rotation of slide 52.

Figure 4:
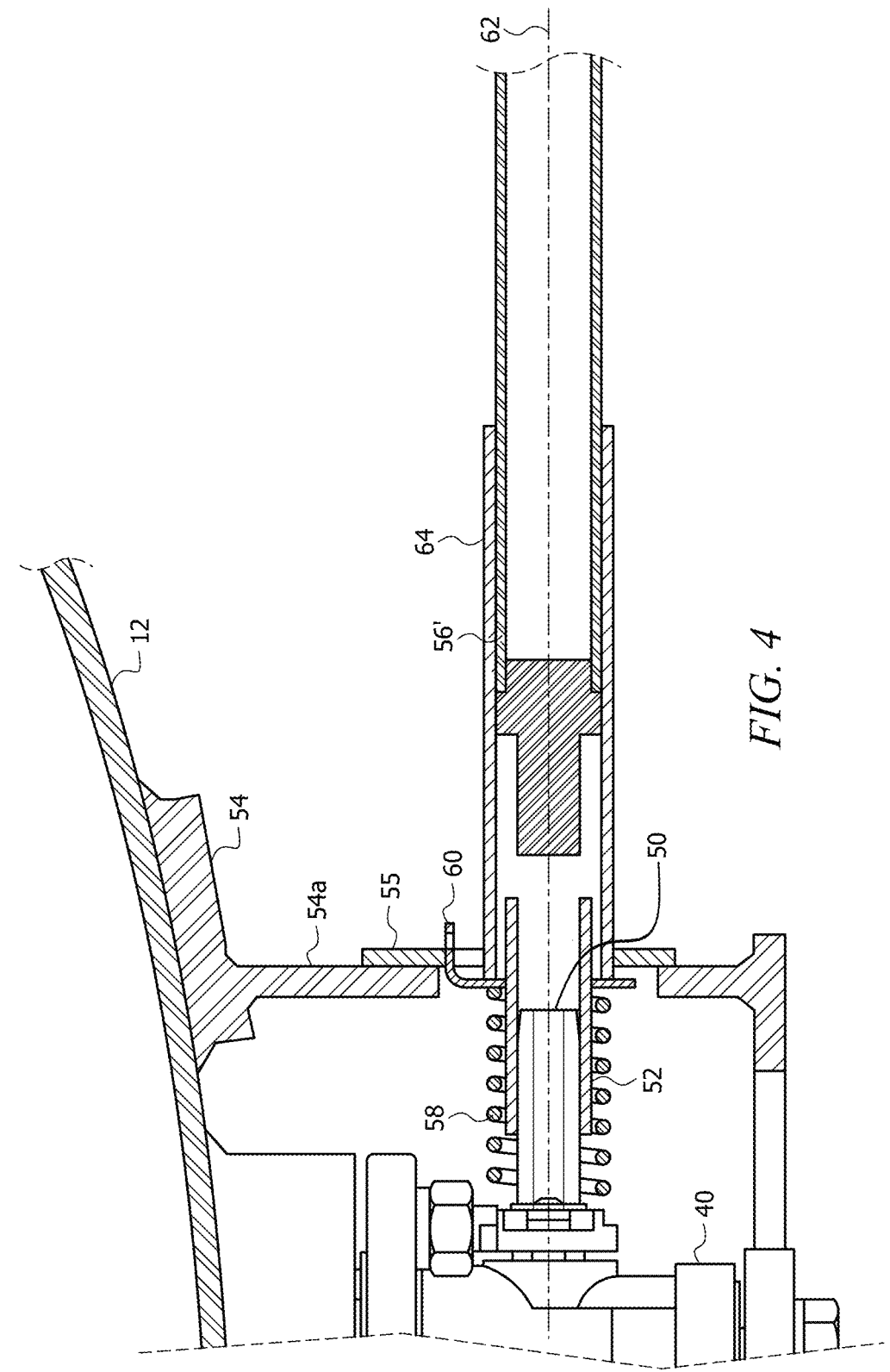
FIG. 4 is a schematic cross-section of another operating assembly for a bottom outlet valve in a closed and locked position, according to particular embodiments.

FIG. 4 is a schematic cross-section of another operating assembly for a bottom outlet valve in a closed and locked position, according to particular embodiments. FIG. 4 is similar to FIG. 2, except the coupling between handle 56' and slide 52 and stem 50 is different. FIG. 2 illustrates an example with a "female" slide, "male" stem, and a "female" handle. FIG. 4 illustrates a "female" slide and a "male" stem and a "male" handle 56'. Other coupling configurations are known to one of skill in the art and not all are illustrated herein.

Figure 5:
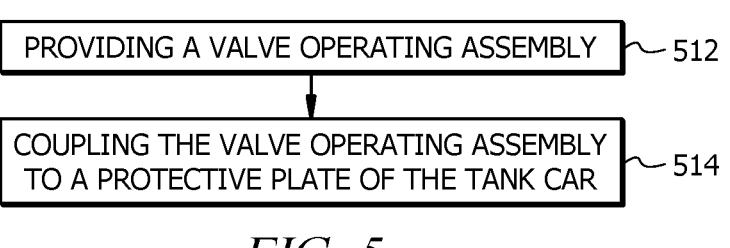
FIG. 5 is a flow diagram illustrating a method for coupling an operating assembly for a bottom outlet valve to a tank car, according to some embodiments.

FIG. 5 is a flow diagram illustrating a method for coupling an operating assembly for a bottom outlet valve to a tank car, according to some embodiments. The operating assembly may include the operating assembly illustrated in FIGS. 2-4.

At step 512, an assembly person provides a valve operating assembly. The valve operating assembly comprises a slide (e.g., slide 52) rotationally coupled to and transversely slidable relative to a valve stem (e.g., stem 50) and/or a handle (e.g., handle 56). The valve operating assembly further comprises a fastening plate (e.g., fastening plate 55) coupled to the slide and the handle (e.g., via handle guide 64). The slide comprises a shape that facilitates rotational coupling with the handle and the slide further comprises a connector (e.g., connector 60) for engaging the fastening plate or a protective structure to limit rotation of the slide about a valve rotational axis when in a first position and free to rotate about the valve rotational axis when in a second position.

At step 512, the assembly person couples the valve operating assembly to a protective plate (e.g., 54a) of the tank car. For example, the assembly person may couple the valve operating assembly to the tank car by sliding the handle into a handle support opening (e.g., handle guide 64) in the protective structure for the bottom outlet valve and may couple the fastening plate to the protective structure. The assembly person may couple the fastening plate via mechanical fasteners (e.g., bolts, screws, etc.), via welding, or via any other suitable coupling.

A benefit of particular embodiments is that a tank car may be retrofitted with skid plates and improved safety operating mechanisms by replacing the old handle with the new bolt on valve operating assembly.

Some embodiments of the disclosure may provide one or more technical advantages. As an example, some embodiments include visual indicators that facilitate an operator or inspector quickly discerning a bottom outlet valve status when proximate the tank car. Particular embodiments prevent rotation of the valve operating assembly when the bottom outlet valve is not in use. Particular embodiments facilitate a security/safety seal for the bottom outlet valve.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Although embodiments of the present disclosure and their advantages have been described in detail, it should be understood that various changes, substitutions and alternations can be made herein without departing from the spirit and scope of the invention as defined by the following example embodiments.

The invention claimed is:

1. A railway tank car comprising:
a tank for transporting a commodity;
a bottom outlet valve coupled to an underside of the tank, comprising:
    a valve control surface, wherein flow of the commodity out of the tank and the bottom outlet valve is controlled by rotation of the valve control surface, and wherein a position of the bottom outlet valve is controlled by a stem coaxial with a rotational axis of the valve control surface and rotationally coupled to the bottom outlet valve;
    a valve operating assembly comprising:
        a slide rotationally coupled to and transversely slidable relative to the stem;
        wherein at least one of the stem or slide comprises a shape that facilitates rotational coupling with a handle;
        a fastening plate;
a protective plate coupled to the underside of the tank approximately parallel to a longitudinal tank center plane in a fixed position offset in a direction along an axis of the stem, wherein the valve operating assembly is coupled to the protective plate via the fastening plate; and
the slide of the valve operating assembly further comprising a connector for engaging at least one of the protective plate or the fastening plate to limit rotation of the slide about the bottom outlet valve rotational axis when in a first position, and the slide is able to rotate about the bottom outlet valve rotational axis when in a second position.

2. The railway tank car of claim 1, wherein the handle is operable to rotationally couple to the stem during operation and to decouple when not in operation.

3. The railway tank car of claim 1, wherein the protective plate comprises a skid that protects the bottom outlet valve in accident conditions.

4. The railway tank car of claim 1, the valve operating assembly further comprising a handle guide coupled to the protective plate.

5. The railway tank car of claim 1, wherein the fastening plate is coupled to the protective plate by a mechanical fastener.

6. The railway tank car of claim 1, the valve operating assembly further comprising a spring that engages the slide and the connector with at least one of the protective plate or the fastening plate so that the slide is rotationally fixed with the protective plate by applying a force parallel to the rotational axis.

7. The railway tank car of claim 6, wherein the spring comprises a compression spring or a tension spring.

8. The railway tank car of claim 1, wherein the slide is directly coupled with the stem.

9. The railway tank car of claim 1, wherein the slide is coupled with the stem via an adaptor rotationally coupled to and transversely slidable to the stem.

10. The railway tank car of claim 1, wherein the connector for engaging at least one of the protective plate or the fastening plate to limit rotation of the slide about the bottom outlet valve rotational axis comprises a transverse projection from the protective plate or fastening plate that engages a void of similar shape in the slide.

11. The railway tank car of claim 1, wherein the connector for engaging at least one of the protective plate or the fastening plate to limit rotation of the slide about the bottom outlet valve rotational axis comprises a transverse projection from the slide that engages a void of similar shape in the protective plate or fastening plate.

12. The railway tank car of claim 11, wherein the transverse projection is visible from the side of the tank car.

13. The railway tank car of claim 11, wherein the transverse projection is configured to accept a safety seal.

14. A valve operating assembly comprising:
a slide rotationally coupled to and transversely slidable relative to a valve stem, wherein at least one of the slide or valve stem comprises a shape that facilitates rotational coupling with a handle and the slide further comprises a connector for engaging at least one of a protective plate or a fastening plate to limit rotation of the slide about a valve rotational axis when in a first position, and the slide is able to rotate about the valve rotational axis when in a second position; and
a spring that engages the connector of the slide with at least one of the protective plate or the fastening plate so that the slide is rotationally fixed with at least one of the protective plate or the fastening plate by applying a force parallel to the rotational axis.

15. The valve operating assembly of claim 14, further comprising the fastening plate coupled to the handle and the protective plate.

16. The valve operating assembly of claim 14, wherein the connector for engaging at least one of the protective plate or the fastening plate to limit rotation of the slide about the valve rotational axis comprises a transverse projection from the protective plate or the fastening plate that engages a void of similar shape in the slide.

17. The valve operating assembly of claim 14, wherein the connector for engaging at least one of the protective plate or the fastening plate to limit rotation of the slide about the valve rotational axis comprises a transverse projection from the slide that engages a void of similar shape in the protective plate or the fastening plate.

18. The valve operating assembly of claim 17, wherein the transverse projection is configured to accept a safety seal.

19. A method for coupling an operating assembly for a bottom outlet valve to a tank car, the method comprising:
providing a valve operating assembly comprising:
a slide rotationally coupled to and transversely slidable relative to a valve stem;
a fastening plate coupled to the slide;
wherein at least one of the slide or valve stem comprises a shape that facilitates rotational coupling with a handle and the slide further comprises a connector for engaging at least one of the fastening plate or a protective plate to limit rotation of the slide about a valve rotational axis when in a first position, and the slide is able to rotate about the valve rotational axis when in a second position;
a spring that engages the connector of the slide with at least one of the protective plate or the fastening plate so that the slide is rotationally fixed with at least one of the protective plate or the fastening plate by applying a force parallel to the rotational axis; and
coupling the fastening plate of the valve operating assembly to the protective plate of the tank car.

* * * * *